United States Patent
Ritchie

(10) Patent No.: US 11,916,728 B2
(45) Date of Patent: Feb. 27, 2024

(54) MULTI-NETWORK MANAGEMENT SYSTEM AND METHOD

(71) Applicant: Level 3 Communications, LLC, Broomfield, CO (US)

(72) Inventor: Austin Ritchie, Parker, CO (US)

(73) Assignee: Level 3 Communications, LLC

(*) Notice: Subject to any disclaimer, the term of this patent is extended or adjusted under 35 U.S.C. 154(b) by 0 days.

(21) Appl. No.: 17/564,464

(22) Filed: Dec. 29, 2021

(65) Prior Publication Data
US 2022/0210010 A1    Jun. 30, 2022

Related U.S. Application Data

(60) Provisional application No. 63/132,241, filed on Dec. 30, 2020.

(51) Int. Cl.
*H04L 41/0806* (2022.01)
*H04L 41/50* (2022.01)

(52) U.S. Cl.
CPC ...... *H04L 41/0806* (2013.01); *H04L 41/5029* (2013.01)

(58) Field of Classification Search
CPC .................. H04L 41/0806; H04L 41/5029
See application file for complete search history.

(56) References Cited

U.S. PATENT DOCUMENTS

| | | | |
|---|---|---|---|
| 9,274,811 B1* | 3/2016 | Reeves | G06F 9/445 |
| 9,590,872 B1* | 3/2017 | Jagtap | H04L 41/0886 |
| 9,712,634 B2* | 7/2017 | Ang | H04L 61/301 |
| 10,031,783 B2* | 7/2018 | Jalagam | G06F 8/61 |
| 10,148,506 B1* | 12/2018 | Anburose | H04L 41/5006 |
| 10,540,216 B2* | 1/2020 | Feijoo | G06F 3/0481 |
| 10,560,370 B1* | 2/2020 | A | H04L 45/28 |
| 10,757,538 B1* | 8/2020 | Stammers | H04W 12/08 |
| 11,323,503 B1* | 5/2022 | Britt | H04L 41/0806 |
| 2011/0283194 A1* | 11/2011 | Chen | G06F 8/38 715/735 |
| 2014/0278623 A1 | 9/2014 | Martinez | |

(Continued)

FOREIGN PATENT DOCUMENTS

| EP | 3050323 | 8/2016 |
|---|---|---|
| EP | 3139271 | 3/2017 |

OTHER PUBLICATIONS

International Search Report and Written Opinion of the International Searching Authority, dated Apr. 20, 2022, Int'l Appl. No. PCT/US21/065512, Int'l Filing Date Dec. 29, 2021; 13 pgs.

(Continued)

*Primary Examiner* — Blake J Rubin

(57) ABSTRACT

A network interface system defines standardized network service requests and related abstracted tasks. In examples, commands needed to configure particular network elements are dependent on the network being utilized and/or the network element(s) being utilized. The network interface system may include a standardization layer, an abstraction layer, and an application programming interface for each of a variety of available networks. Upon a request for a network service, the related abstracted tasks may be translated into network-specific commands to configure network elements of disparate networks to provide the requested service.

12 Claims, 6 Drawing Sheets

(56) References Cited

U.S. PATENT DOCUMENTS

| | | | |
|---|---|---|---|
| 2014/0280817 A1 | 9/2014 | Uppalapati | |
| 2014/0280961 A1* | 9/2014 | Martinez | H04L 41/40 709/226 |
| 2015/0302440 A1* | 10/2015 | Monden | G06Q 30/0206 705/7.35 |
| 2015/0324182 A1* | 11/2015 | Barros | G06F 9/455 717/174 |
| 2015/0339107 A1* | 11/2015 | Krishnamurthy | G06F 8/34 717/107 |
| 2016/0057077 A1* | 2/2016 | Gomatam | H04L 47/788 709/226 |
| 2016/0197835 A1* | 7/2016 | Luft | H04L 12/465 709/223 |
| 2016/0234250 A1* | 8/2016 | Ashley | H04L 63/20 |
| 2017/0019314 A1* | 1/2017 | Chieu | H04L 41/5045 |
| 2017/0024717 A1* | 1/2017 | Istrati | G06Q 30/0641 |
| 2017/0064009 A1* | 3/2017 | Baltar | H04L 67/148 |
| 2017/0178027 A1* | 6/2017 | Duggan | G06F 9/543 |
| 2017/0236105 A1 | 8/2017 | Feldpusch | |
| 2017/0257432 A1* | 9/2017 | Fu | H04L 67/1014 |
| 2018/0024700 A1* | 1/2018 | Dadd | G06N 5/022 715/736 |
| 2018/0157384 A1* | 6/2018 | Baneva | G06F 8/31 |
| 2018/0164965 A1* | 6/2018 | Chen | G06F 9/451 |
| 2018/0351957 A1* | 12/2018 | Mott | H04L 63/20 |
| 2019/0079744 A1* | 3/2019 | Bosch | G06F 8/60 |
| 2019/0138318 A1* | 5/2019 | Yang | H04L 41/0806 |
| 2019/0158498 A1* | 5/2019 | Brouillette | G06F 21/629 |
| 2019/0342379 A1* | 11/2019 | Shukla | G06F 16/258 |
| 2020/0053834 A1* | 2/2020 | Dahan | H04L 41/0816 |
| 2020/0264937 A1 | 8/2020 | Rao | |
| 2020/0349157 A1* | 11/2020 | Gupta | G06F 16/243 |
| 2020/0356536 A1* | 11/2020 | Nilsson | G06F 16/122 |
| 2020/0401452 A1* | 12/2020 | Piercey | G06F 9/5016 |
| 2021/0011947 A1* | 1/2021 | Bhamidipaty | G06F 16/26 |
| 2021/0019194 A1* | 1/2021 | Bahl | G06F 9/3877 |
| 2021/0073696 A1* | 3/2021 | Gao | G06N 20/00 |
| 2021/0240750 A1* | 8/2021 | Schwartz | G06F 40/56 |
| 2022/0006701 A1* | 1/2022 | Patel | H04L 41/12 |
| 2022/0035606 A1* | 2/2022 | Walsh | G06F 8/34 |
| 2022/0222070 A1* | 7/2022 | Kunjuramanpillai | G06F 8/77 |

OTHER PUBLICATIONS

International Preliminary Report on Patentability, dated Jul. 13, 2023, Int'l Appl. No. PCT/US2021/065512, Int'l Filing Date Dec. 29, 2021; 10 pgs.

* cited by examiner

MULTI-NETWORK MANAGEMENT SYSTEM AND METHOD

CROSS REFERENCE TO RELATED APPLICATIONS

This application claims the benefit of U.S. Patent Application No. 63/132,241, entitled "MULTI-NETWORK MANAGEMENT SYSTEM AND METHOD," filed on Dec. 30, 2020, which is incorporated herein by reference, in its entirety, for all that it teaches and for all purposes.

FIELD

The present disclosure is generally directed to networking. More particularly, the present disclosure relates to provisioning network services.

BACKGROUND

Many applications, such as data storage, processing, and presentation applications, utilize a communication network in their operation. Some applications, sometimes referred to as cloud-based applications, run remotely and are only accessible via the communication network. These applications may, for example, be hosted from a data center. A data center is a facility used to house computer systems and associated components, such as servers, telecommunications, and storage systems.

Cloud-based applications may be beneficial in that they allow resources to be shared among users. A user may avoid the need to purchase the underlying hardware and software for an application, instead paying a usage fee, perhaps by the hour. Taking advantage of economies of scale, cloud-based applications may be available at a lower cost than buying a software license and any underlying hardware outright.

Network users may interact with the cloud-based applications via networks. However, the cloud-based applications can be associated with computing systems in different geographic areas, provided from several different vendors, accessed from diverse networks etc. To connect to the cloud-based application, the Internet and other networks may be used. However, it is desirable for many users to have these connections provided in a more easily configurable operation.

SUMMARY

In examples, method is provided that may include receiving a user request to provision a network service, determining an abstracted task to provision a network element associated with the network service based on the user request, determining a network-specific task associated with a first network and the abstracted task; and configuring the network element to provide the network service to an endpoint by sending one or more network-specific commands associated with the network-specific task to the network element.

In another example, a system is provided including at least one networking application programming interface (API) server comprising at least one processor and memory, the at least one networking API server implementing a standardization layer and an abstraction layer, the standardization layer selecting a first network based on a standardized request. In examples, the abstraction layer determines an abstracted task to provision a network element, associated with the first network, based on the standardized request, and determines a network-specific task associated with the first network and the abstracted task configurable to connect an endpoint serving a user to the network element through the first network. Further, one or more APIs may be included to send one or more network-specific commands to the network element to configure the network element based on the network-specific task.

In another example, one or more tangible non-transitory computer-readable storage media are provided for storing computer-executable instructions for performing a network service, the computer process comprising receiving a user request to provision a network service, determining an abstracted task to provision a network element associated with the network service based on the user request, determining a network-specific task associated with a first network and the abstracted task; and configuring the network element to provide the network service to an endpoint by sending one or more network-specific commands associated with the network-specific task to the network element.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Systems

Figure 1A:
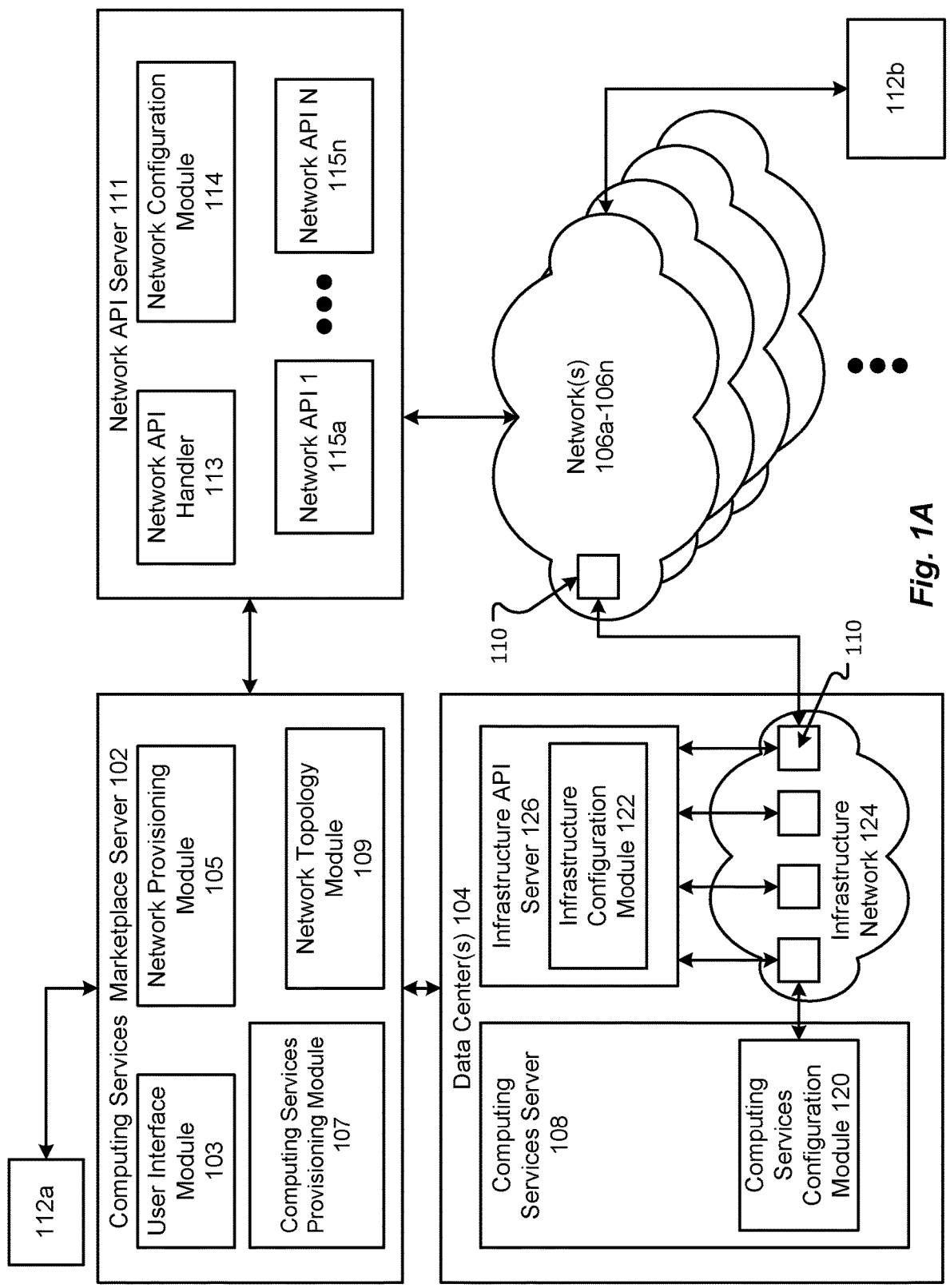
FIG. 1A depicts a diagram that illustrates network API server modules, marketplace server modules, and/or data center modules in accordance with examples of the present disclosure.

FIG. 1 illustrates a system 100 that provides a dedicated connection using one or more communication network(s) 106. Communication network(s) 106 may be a metropolitan area network (MAN) or wide area network (WAN). It may utilize any point-to-point or multipoint-to-multipoint networking protocols. The network protocols used may include, for example, Ethernet, Transport Control Protocol (TCP), User Datagram Protocol (UDP), Internet Protocol (IP), Multiprotocol Label Switching (MPLS), Asynchronous Transfer Mode (ATM), High-Level Data Link Control (HDLC), Frame Relay, or Synchronous Optical Networking (SONET)/Synchronous Digital Hierarchy (SDH). Communication network(s) 106 may, for example, be a network separate from the Internet.

Computing service marketplace server 102 provides users the ability to purchase the computing services. Examples of using a computing service marketplace server to purchase computing services can be found at U.S. Pat. No. 10,652,110, which is incorporated by reference herein for all that it teaches. Computing service marketplace server 102 includes an interface for the users to select the applications they need. It further provisions network resources for connecting users to the servers that provide the applications. Computing service marketplace server 102 is connected to the network element processes or devices (e.g., switches, routers, etc.) in network(s) 106 and is capable of configuring the devices to provide the required connections.

The required connection(s) may, for example, be a dedicated network connection(s). A dedicated network connection(s) is a connection with bandwidth reserved for a particular user. A dedicated network connection(s) may be set up using either a private or public network service technology. In other words, no other user of the network can have access to the bandwidth reserved for a particular user on a dedicated connection. Reserving bandwidth may involve associating a particular bandwidth with a user. Such a dedicated network connection may be point-to-point, in which the connection connects two points on the network. Also, the connection may be multipoint-to-multipoint, in which a set of one or more points on the network is connected to a second set of one or more network points. Additionally, the connection may be point-to-multipoint, in which a point on the network is connected to a set of one or more network points. A network element may receive traffic for a particular network connection on a particular port.

In an example, network(s) 106 may utilize an Ethernet protocol. In that example, the connection may be an Ethernet E-Line or E-LAN. E-Line and E-LAN are data services defined by the Metro Ethernet Forum that provide point-to-point and multipoint-to-multipoint Ethernet connections between a pair or plurality of user network interfaces. Using a dedicated network connection(s) on a network(s), such as a private or shared network, may provide more capacity, reliably, and security than merely connecting via the Internet.

In implementations, network(s) 106 are connected to a data center(s), e.g., data center 104. Data center(s) 104 can be connected to network(s) 106 through a network element 110, and other data centers can be connected to the network(s) 106 through other network element(s). Data center(s) 104 are each facilities used to house computer systems and associated components, such as their own network infrastructures. They may include redundant or backup power supplies, redundant data communications connections, environmental controls (e.g., air conditioning and fire suppression), and security devices.

Each data center 104 can include a computing services server 108. Computing services server 108 comprises machine(s) that run a computing services application. It provides computing services-based services or applications to users. Computing services server 108 may provide such a service after receiving a request from a user to provision a computing services-based service element. A computing services-based service element can be an application such as a database or a web application. Computing services servers 108 and 126 may be in data centers 104 and can be geographically apart.

In implementations, a user can, using computing services marketplace server 102, purchase a dedicated network connection together with the computing services-based service element. In response to the purchase request, computing services marketplace server 102 communicates with the computing services server 108 to provision the computing services-based service and communicate with network(s) 106 to provision the dedicated network connection. Provisioning the computing services-based service elements in computing services server 108 together with the dedicated network connection among the computing services server enables the computing services-based service elements to communicate over a dedicated connection and to provision network and compute services together.

In an example use case, a developer may use computing services-based service connections to build a web-based application. The web-based application may have two components: a web server and a database. Referring to FIG. 1, the web server may be on computing services server 108 and the database may be on another computing services server. The developer may select the appropriate computing services-based services and a network connection between the two servers from computing services marketplace server 102. In response to the request, computing services marketplace server 102 may send messages to computing services server 108 to set up computing services-based services and make them available to the developer. Also in response to the request, the computing services marketplace server 102 may instruct network(s) 106 set up a network connection between a data center 104, which host the respective computing services servers 108 and the database.

Multiple networks 106 may provide a connection between network elements 110. Network elements 110 can reside at the edge of network(s) 106 and may provide entry into data centers 104 or even be co-located in data centers 104. However, for data to reach computing services servers 108, additional routing may be required within and without data centers 104.

The system 100 can also provide a dedicated connection to a computing service element. System 100 can include one or more of, but is not limited to, a computing services (e.g., cloud services) marketplace server 102, a data center 104, a network(s) 106, and/or network elements 110. Additionally, system 100 may include a network API server 111 that allows the marketplace server 102 to interface with network(s) 106.

Computing services marketplace server 102 allows a user to request a computing service, for example, a cloud computing service. Computing services marketplace server 102 includes a user interface module 103, a network provisioning module 105, a computing services provisioning module 107, and a network topology module 109. The user may connect to computing services marketplace server 102 though user interface module 103. Using this interface, the user can select the computing services applications or other services that the user requires. For example, user interface module 103 can receive a request from a user to provision a Customer Relationship Management (CRM) service element, a relational database service element, a network element, etc. User interface module 103 may also allow a user to request a dedicated network connection.

The dedicated network connection(s) may span over one or more network(s) 106 outside of a data center and the infrastructure network within the data center. The dedicated network connection(s) can connect the data center to another location that may be geographically separated from the data center, for example, the user's system. For example, the dedicated network connections may include several networks or network elements that allow the user to access and use the computing service.

The components 102-128, of the system 100 can function as computing devices, communication devices, etc. The components 102-128 may be formed from software, hardware, or a combination of software and hardware. Some of the components may be virtual, where one or more software instances of the component is executed on a computing device. However, some components may be physical, e.g., physical servers. The hardware components may include one or more of, but is not limited to, one or more processors, one or more input interfaces, one or more output interfaces, and one or more memory components. Examples of the processors as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core® family of processors, the Intel® Xeon® family of processors, the Intel® Atom® family of processors, the Intel Itanium® family of processors, Intel® Core® i5-4670K and i7-4770K 22 nm Haswell, Intel® Core® i5-3570K 22 nm Ivy Bridge, the AMD® FX® family of processors, AMD® FX-4300, FX-6300, and FX-8350 32 nm Vishera, AMD® Kaveri processors, Texas Instruments® Jacinto C6000® automotive infotainment processors, Texas Instruments® OMAP® automotive-grade mobile processors, ARM® Cortex®-M processors, ARM®. Cortex-A and ARM926EJ-S® processors, other industry-equivalent processors, and may perform computational functions using any known or future-developed standard, instruction set, libraries, and/or architecture. The processors can also include one or more of, but are not limited to, application specific integrated circuits (ASIC), field programmable gate arrays (FPGA), other central processing units, a system-on-chip (SOC), or other types of processors.

To provide networking options to a user, user interface module 103 may interact with network topology module 109. The computing services-based service element may be offered from a plurality of data centers or other service providers in disparate locations. Network topology module 109 may select, based on a location of the user, a data center in proximity of the user's location. Based on the selected data center's location, network topology module 109 may determine the topology of the dedicated network connection.

To determine the topology of the dedicated network connection, network topology module 109 may make API calls to network API server 111. Network API server 111 may reply to the API calls using a network API handler module 113. For example, network topology module 109 may ask network API server 111 whether network connections are available that connect to the data centers offering the computing services-based service element. Alternatively, network topology module 109 may periodically ask for the locations of all available data centers on the network and correlate those data centers with the data centers offering the computing services service element. In addition to determining the available endpoint locations, as an example network topology module 109 may query for the available bandwidth, latency, or jitter between two locations. The network topology module 109 can thus send standardized requests for network services to the network API server 111.

For example, a user's enterprise may be in Los Angeles, and the user may desire a computing services-based database service. The computing services-based service may be offered in data centers in Seattle, Las Vegas, and New York. To connect with the computing services-based service, network(s) 106 may be able to provide a dedicated network connection between the user's enterprise in Los Angeles and the data center in Seattle or the data center in Las Vegas. User interface module 103 may present a standardized request to the user. For example, the user may be presented simply with a request for data center services. The system 100 may then convert this standardized request into actionable network configuration changes, which are specific to various network providers, to implement the request.

User interface module 103 may also present prices or other selections associated with the various options. To determine the quote, user interface module 103 may send an API request to network API handler module 113. Network API handler module 113 can determine options (e.g., price, speed, bandwidth allotment, etc.) for the usage of the resources by the user. The quote can be based on parameters such as a user's location and locations of available data centers. The quote may also vary depending on a service level, such as a bandwidth, latency, jitter, or data quantity transferred, over the connections.

From various options, a user may, using user interface module 103, select standardized computing services and/or network services. Once the user has selected the desired options, the user can make a selection to submit the order. The selection may, for example, be in the form of a single button on an HTML, page that, when selected, causes the user's client to send an HTTP request to provision both the computing services and network services. In this way, by selecting a single user interface element, a user can request that both the computing services and network services be provisioned, In response to a user's request, network provisioning module 105 provisions the dedicated network connection. Network provisioning module 105 provisions the computing services-based service element together with the dedicated network connection. Such provisioning enables the computing services-based service element to utilize the dedicated network connection. To provision the computing services-based service element, network provisioning module 105 may send an API request to network API server 111.

In response to the API request, network API server 111 may use a network configuration module 114 to configure network(s) 106a-106n (also collectively referred to as network(s) 106) to provide the network connection(s). Network configuration module 114 may determine which network elements 110 on network(s) 106 need to be configured to achieve the requested change. For example, network configuration module 114 may identify endpoint devices for each of the locations connected using the network connectivity services, such as network elements 110, in FIG. 1.

Once network configuration module 114 identifies each of the interconnected network elements, the network configuration module 114 can configure the network element devices to provide the requested network connections to the user. For example, network configuration module 114 may send configuration commands to each of the network providers. Configuring these different types of network elements associated with different networking providers may require different commands. To address this, network configuration module 114 may abstract the commands of the networking providers into a common nomenclature. Then, these abstracted tasks can be associated with standardized requests.

As the network providers often provide similar services, although having different interface protocols and procedures, the network configuration module 114 can abstract the underlying tasks into common processes or tasks. In an example, network configuration module 114 may utilize different sub-modules that can translate the mapping of generic attribute models to the specific configuration instruction set of the device being modified. Then, network configuration module 114 may send the appropriate network-specific commands to each of the network elements. In examples, the network-specific commands are dependent on the network being utilized and/or the network element(s) being utilized. In this way, by interacting with network configuration module 114 using API calls, network provisioning module 105 configures the dedicated network connection across the network(s) 106.

As mentioned above, the dedicated network connection across network(s) 106 may connect various data centers or may connect a data center with an enterprise. In addition to configuring a dedicated network connection across network(s) 106, network provisioning module 105 may also provision a network connection within data center 104.

To provision a network connection within data center 104, network provisioning module 105 may send an API request to an infrastructure API server 126. Infrastructure API server 126 has an infrastructure configuration module 122. Infrastructure configuration module 122 operates in a similar manner as network configuration module 114. Like network configuration module 114, infrastructure configuration module 122 looks up the network elements that must be configured on the network, in this case infrastructure network 124, and sends the appropriate commands to the network elements to configure the connection.

In implementations, a data center may use Ethernet protocol on its infrastructure network. In such scenario, infrastructure configuration module 122 may, for example, use a tunneling algorithm through the Ethernet network elements of data center 104 to provide a seamless dedicated connection from network element 110 to computing services server 108. In this way, network provisioning module 105, in response to the user's request, provisions an infrastructure network connection within the data center. The infrastructure network connection connects the computing services-based service element with the network.

Not only are infrastructure and wide area connections implemented in response to the user's request, but the computing services service element may be also provisioned. Based on the user's request, computing services provisioning module 107 instructs the computing services configuration module 120 to provide access to the requested application by the user.

Computing services configuration module 120, which may reside on the computing services server 108, is connected to the infrastructure network 124 and provides access to the requested application by the user. The dedicated connection that is set up on the infrastructure network 124 can communicate with computing services configuration module 120 to provide the user with access to the requested application.

To provide access to the requested application, computing services configuration module 120 may involve installing new software or configuring existing software to support additional users. For example, if the user requests a Linux server, computing services configuration module 120 may configure a virtual machine to run a Linux operating system. A skilled artisan would recognize that other computing services may be provisioned in other ways. In this way, in response to a single user request, implementations can automatically provision both a computing services-based service element and a dedicated network connection to provide secure access to the element.

In some implementations, the provisioning may involve immediately setting up and activating the computing services-based service element and the dedicated network connection. In other implementations, the provisioning may also involve scheduling the computing services-based service element and the dedicated network connection to be activated at some point in the future. In one implementation, the user can set, through an API call, times in the future to activate and deactivate the service. When the activate time occurs, computing services configuration module 120, infrastructure configuration module 122 and network configuration module 114 set up and activate the computing services-based service elements, the infrastructure network connection on infrastructure network 124, and the network connection on network(s) 106 respectively. Then, when deactivate time occurs, the respective modules deactivate the respective services. The times may occur on repeating basis.

In another similar implementation, the user can set, again through an API call, conditions that trigger activation or deactivation of the services. The conditions may be triggered based on usage characteristics of other connections or usage characteristics of computing services-based services. For example, a rule may state that when a relational database service reaches 80% of storage capacity, another database service element and associated network connection services will be allocated. In this way, implementations allow both computing services-based and network service elements to be automatically allocated based on future needs.

As each network 106a-106n may have different interface requirements, the network API server 111 can have two or more network APIs 115a-115n that each are associated with a different network 106a-n. The APIs 115 can apply network specific commands and configurations for the abstracted tasks requested by the network configuration module 114. In this way, the network API server 111 can be expanded and/or changed when networks 106 are added or changed.

The various components 102-128 above can be embodied as computing systems having a processing unit (or processor) and memory. The memory components may be disk drives, optical storage devices, solid-state storage devices, such as a random access memory ("RAM") and/or a read-only memory ("ROM"), which can be programmable, flash-updateable and/or the like. Additionally or alternatively, each component 102-126 may have two or more processors, each with dedicated memory.

Figure 1B:
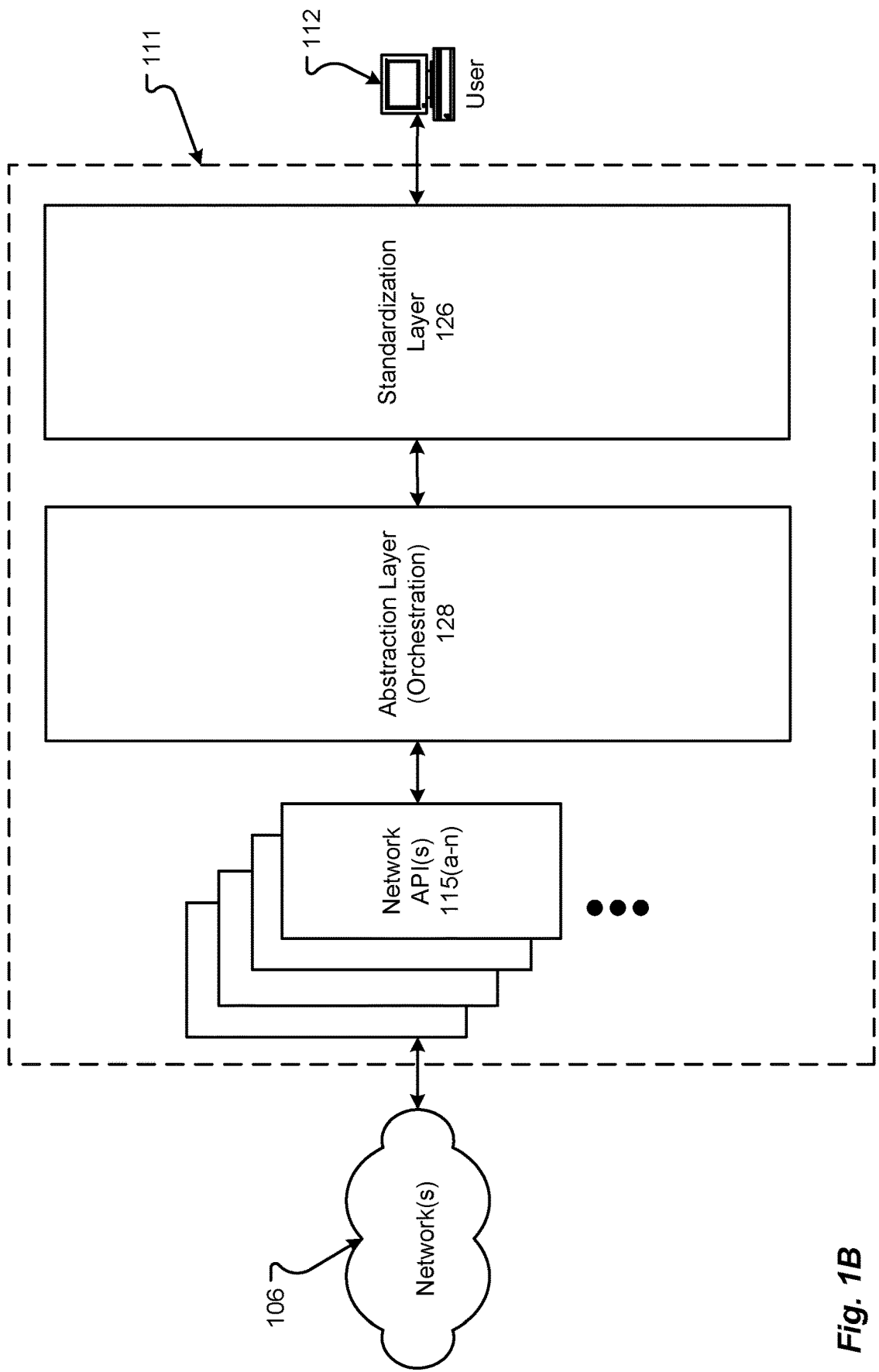
FIG. 1B depicts a diagram that illustrates a network API server in accordance with examples of the present disclosure.

The present disclosure also provides for an implementation of the network API server 111, as shown in FIG. 1B. A network API server 111 can interface with the computing services marketplace server 102, with one or more endpoints (also referred to as user(s)) 112 (which may comprise user computing device(s)) or with other endpoints/user machines, possibly through a user interface module 103. In examples, user 112 may comprise a first user 112a that causes the network service(s) to be configured for a second user 112b to use. Unless otherwise noted, user 112 comprises both user 112a and user 112b. In examples, user 112a and 112b may be the same user or different users. The user 112 may represent a Local Area Network (LAN), a computing system, another network, etc. The network API server 111 can also interface with one or more networks 106 to configure and/or control the network elements. The network API server 111 can include a standardization layer 126 that can generalize and standardize the network requirements or configurations provided by an abstraction layer 128 to mate or match with the standardized requests from the user 112a. Further, the standardization layer 126 can also interpret the standardized requests provided by the user interface module 103 into a set of tasks or requirements for the abstraction layer 128. The standardization layer 118 can standardize the various network requirements/architectures into a standard set of tasks that may be requested by the user 112*a*. These standardized requests can also be sent to the abstraction layer 128.

The abstraction layer 128 can include connections to one or more network APIs. The abstraction layer 128 receives the networking requests from the standardization layer 126. In some implementations, the abstraction layer 128 can receive the requests directly from the user 112*a*. The abstraction layer 128 can then create operational requirements for the request. Thus, the abstraction layer 128 can interpret the request, and any metadata associated with the request, e.g., geographical area, user's home network, user's system(s), etc., and determine which network(s) and/or device(s) should be used to service the request. The abstraction layer 128 can also translate the standardized tasks from the standardization layer 126 into different sets of network-specific tasks for each of the networks 106. In examples, the same standardized task provided by the standardization layer 126 may result in, or require, entirely separate sets of network-specific tasks required by the individual requirements of the networks 106 and network elements within the networks 106. The abstraction layer 128 may then send network-specific commands (based on the network-specific tasks) to one or more network APIs 115 to configure network elements associated with the various networks 106.

The network APIs 115 sends the request to retrieve inventory or resources from the network(s) 106. There can be more than one network API 115 to provision the various network(s) 106. Thus, the abstraction layer 128 can determine which network APIs 115 should receive the request from the standardization layer 126. However, in some implementations, there may be one predetermined network API 115 that can configure the network resources. Another API 115 can configure computing resources, e.g., provision of a virtual server, etc. Other network APIs 115 can function as a virtual network function controller, a transport network controller, a Software-Defined Wide Area Network (SD WAN) controller (for deploying SD WAN services) etc.

Figure 2A:
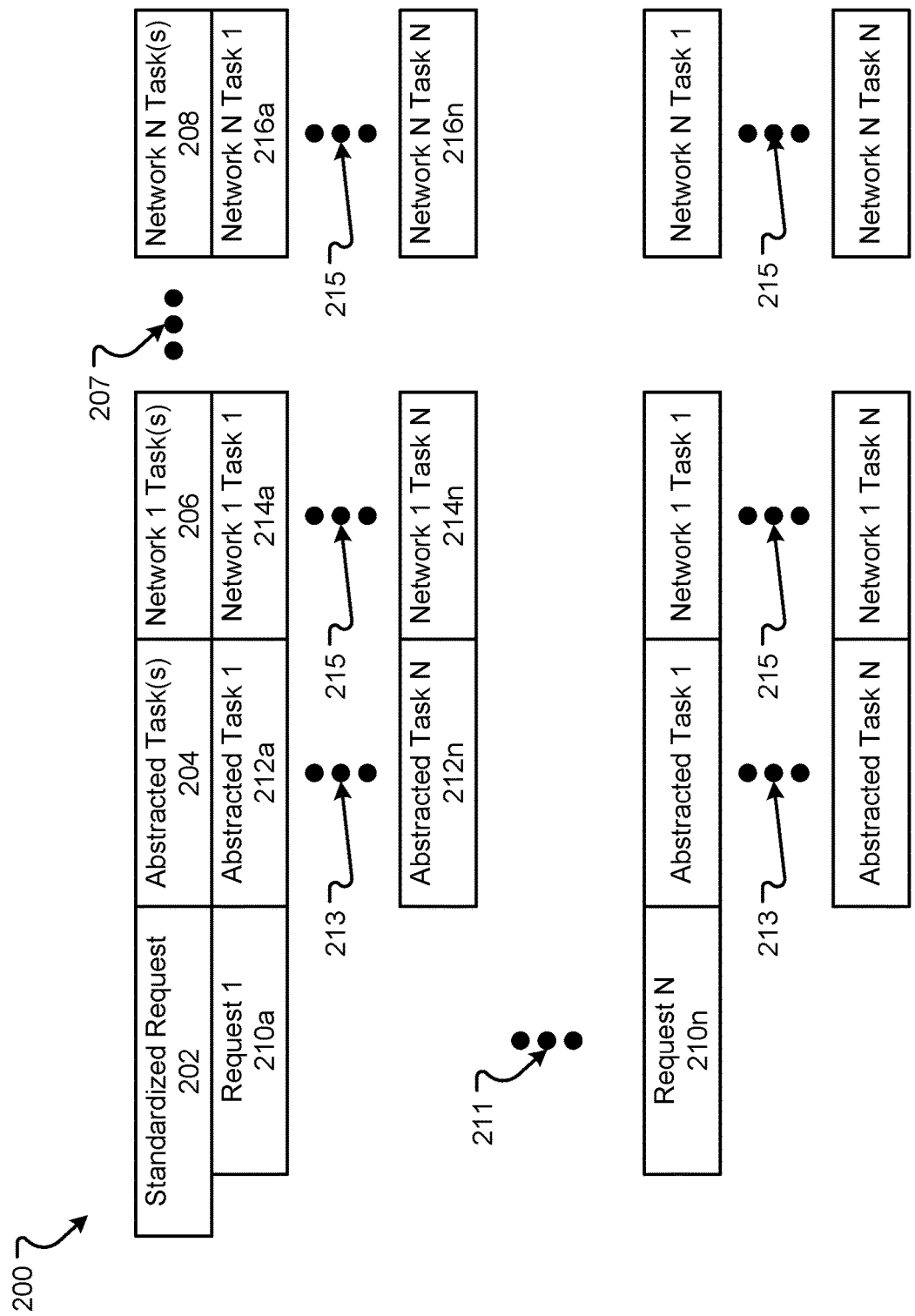
FIG. 2A depicts a data structure that abstracts and standardizes network services in accordance with examples of the present disclosure.

Data:

A data structure 200, which may be stored or retrieved from a data store in communication with the network API server 111, may be as shown in FIG. 2A. The data structure 200 can represent a portion of the data provided in the data store. Further, the data structure 200 may represent a mapping between a standardized request for services 202, abstracted tasks 204 associated with the standardized request 202, and network-specific tasks 206, 208 that are mapped to the abstracted tasks 204. There can be several networks 106*a-n* that can provide the particular service. Thus, there are several sets of network-specific tasks 206, 208 that may be listed in data structure 200, and there can be more or fewer of the network-specific tasks 206, 208 than those shown in FIG. 2A, as represented by ellipses 207.

Each request 210 may have one or more abstracted task 212*a*-212*n* associated with the request 210. There can be more or fewer abstracted tasks 212 provided for each request 210 than those shown in FIG. 2A, as represented by ellipses 213. The abstracted tasks 212 are the separate processes that are performed to configure a network 106, computing resource, etc. to provide the requested service. These abstracted tasks 212 are generally common across all networks 106, meaning these tasks 212 may be performed on all or a majority (e.g., 90%, 80%, etc.) of networks 106 to perform the service requested. For example, if the user desires to access the Internet, a port on a leaf switch may need to be configured, a connection from a leaf switch to a spine switch may need to be configured, etc. Each abstracted task 212 may then be mapped to one or more network-specific tasks 206.

Each abstracted task 212 may be mapped to one or more network-specific tasks 214*a*-214*n* or 216*a*-216*n*. There can be more or fewer tasks 214, 216, provided in data structure 200, than those shown in FIG. 2A, as represented by ellipses 215. The user 112*a* may determine which network 106 to use for a particular service by choosing the network 106 (or computing resource, other resource or service, or combination thereof) in a user interface. In other implementations, the network 106 (or computing resource, other resource or service, or combination thereof) choice may be predetermined or dynamically determined based on a set of requirements.

Regardless of how or which network 106 (or computing resource, other resource or service, or combination thereof) is selected, the network 106 requires a set of tasks 214, 216 to be performed to configure a network 106 (or computing resource, other resource or service, or combination thereof) to provide the requested service. These network-specific tasks 214, 216 implement the abstracted tasks 212 but are specific to the network 106 (or computing resource, other resource or service, or combination thereof). As such, each abstracted task 212 may be mapped to one or more network-specific tasks 214, 216 that complete the task. In this way, the network API server 111 can map a standardized request from a user to a set of network-specific tasks 214, 216 to complete the request. In examples, the network-specific tasks 214, 216 comprise or define network-specific commands that can be sent through an API 115 to effect the configuration of network elements. Once the network-specific tasks 214, 216 have been determined, they can be used to send network-specific commands through, e.g., an API 115, to cause the network-specific tasks to be performed and configure the necessary network elements.

Other information may also be provided in the data structure 200 that is not shown. First, the mapping may also provide which network API 115 is used to interface with each network 206-208. Further, each network 206-208 may be associated with metadata. For example, the prices for using that network's services, availability of services or resources, and other requirements or benefits of the particular network 106 (or computing resource, other resource or service, or combination thereof) may be provided.

Figure 2B:
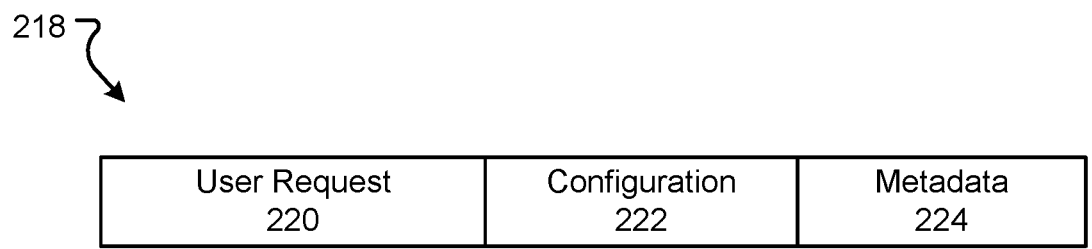
FIG. 2B depicts a data structure for a user request for standardized network services in accordance with examples of the present disclosure.

Another data structure 218, representing a user request, may be as shown in FIG. 2B. Each user 112*a* can make multiple requests 218 or there may be multiple users 212 making requests 218. As such, there may be numerous requests 218 provided in the implementations herein. The request 218 can include one or more of, but is not limited to, a standardized user request 220, a configuration 222, and/or metadata 224. There may be more or fewer fields in the request 218 than those shown in FIG. 2B.

The user request 220 represents the standardized request 202 provided in data structure 200. The user request 220 can be received through a user interface (e.g., via user interface module 103) from the user 112*a*. When the user 112*a* chooses a service to request in the user interface, data structure 218 may be formed. Thus, the user request 220 can be included in the data structure 218 sent to the network API server 111.

When provided with the request 220, a configuration 222 of the user's system, network, etc. may be discovered and provided to the network API server 111. The configuration 222 provides the information needed to determine how to configure the network 106 to communicate with and/or connect to the user 112b. The configuration 222 can include one or more of, but is not limited to, the type of user computing system, the router, access point, service provider, switch(es), etc. that comprise the front end of the user's system, the data storage capabilities and systems, either local or distant to the user 112b, etc.

The request 218 can also include one or more items of metadata 224. The metadata 224 can provide information not included in the configuration 222 but that may also provide guidance on which network 106 to select. For example, the metadata 224 can include one or more of, but is not limited to, temporal characteristics (e.g., the time, date, etc.) associated with the request, locational characteristics (e.g., geographic location of the user 112b, network location of the user 112b, etc.), business characteristics (e.g., price restrictions, preferred service providers, etc.), or other characteristics. The metadata 224 may be automatically retrieved or determined or can be input by the user 112a when requesting the service.

Figure 3:
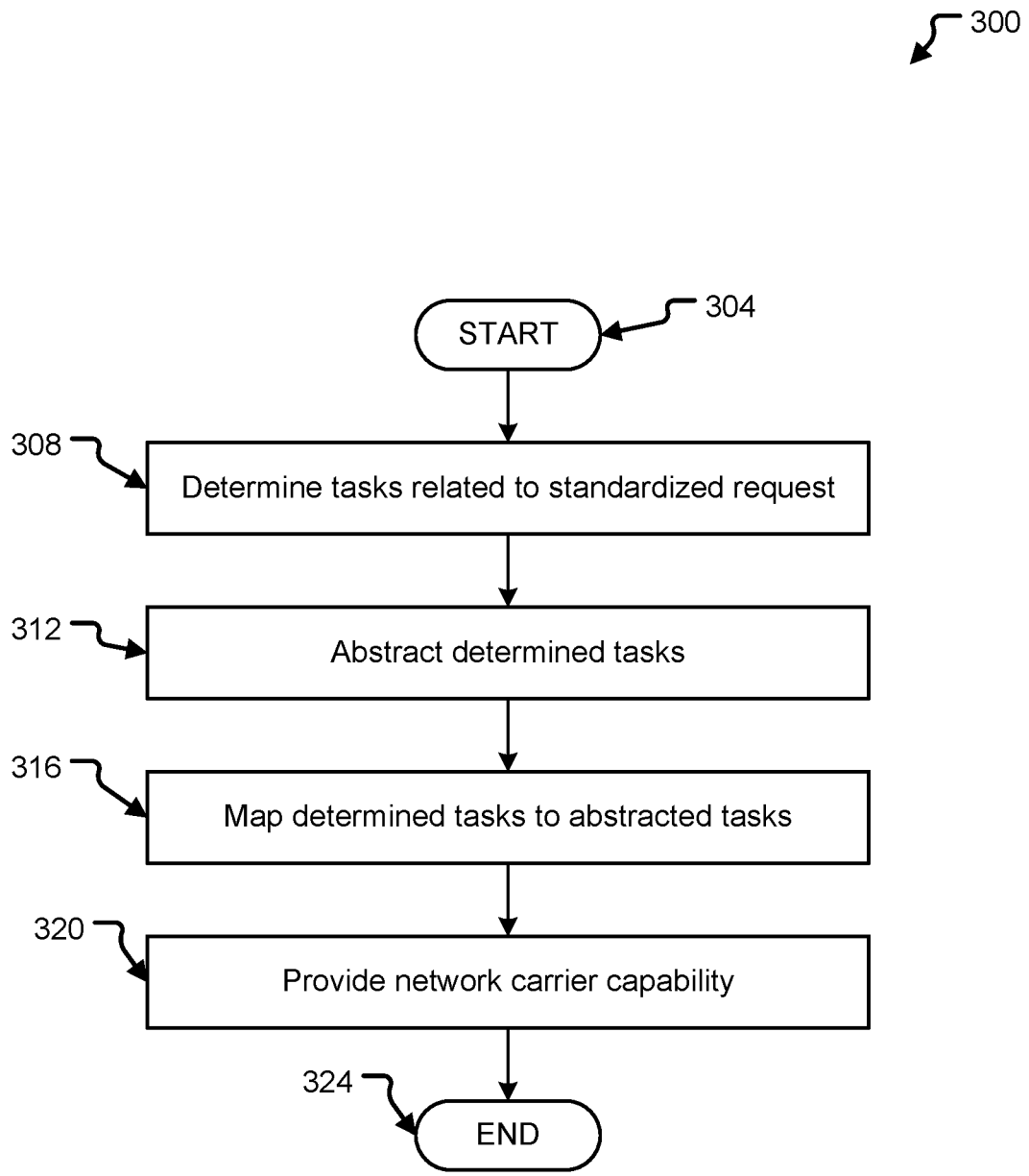
FIG. 3 depicts a method diagram for abstracting network services in accordance with one implementation.

Methods:

An example of a method 300 for abstracting network tasks may be as shown in FIG. 3. A general order for the operations of the method 300 is shown in FIG. 3. Generally, the method 300 starts with a start operation 304 and ends with an end operation 324. The method 300 can include more or fewer operations or can arrange the order of the operations differently than those shown in FIG. 3. The method 300 can be executed as a set of computer-executable instructions executed by a processor, such as processor of a component, and encoded or stored on a computer readable medium. Further, the method 300 can be performed by gates or circuits associated with a processor, an ASIC, a FPGA, a SOC, or other hardware device. Hereinafter, the method 300 shall be explained with reference to the systems, components, devices, modules, software, signals, data structures, interfaces, methods, etc. described herein; however, it will be understood by those of skill in the art that some or all of the operations of method 300 can be performed by or using different elements from those described below.

At operation 308, tasks related to standardized requests can be determined. For Example, the standardization layer 126 can determine tasks related to standardized requests. The standardization layer 126 may create one or more standardized requests from services provided by one or more networks 106. Thus, the standardization layer 126 can elevate or promote the different types of functions of the networks 106 into one or more different requests for services 202. From these various requests 210, the standardization layer 126 may signal the abstraction layer 128 to then determine and/or list the abstracted tasks for the requests 210.

Flow proceeds to operation 312, where determined tasks may be abstracted. For example, the abstraction layer 128 may abstract or determine tasks. Based on the common or general requests 210, the abstraction layer 128 may create the abstracted tasks 212. The abstraction layer 128 can determine a set of common tasks or functions, regardless of the names or processes specific to the networks 106, which may be performed by the one or more networks 106 to fulfill the request 210. These abstracted tasks 212, with the requests 210 may then be stored in data structure 200.

Flow then proceeds to operation 316, where the determined tasks are mapped to abstract tasks. For example, abstraction layer 128 may then map the determined tasks 212 to the network-specific tasks 214, 216, which may also include mapping the names used by the networks 106, the APIs 115 used by the networks 106, the configuration processes used by the networks 106, etc. Thus, the abstraction layer 128 may determine which one or more tasks 214, 216 relate to each abstracted task 212. There may be an identifier (ID) or link between the abstracted task 212 and the network specific task 214, 216. Thus, the abstracted task 212 is linked through a data structure element to the network specific task 214, 216. These associations and network tasks 214, 216 may then be stored in data structure 200 for future retrieval.

At operation 320, network carrier capability may then be provided. For example, after the data structure 200 is created and the mapping is completed, the abstraction layer 128 may determine the capability (or capabilities) of network(s) to perform the abstracted tasks and signal such availability to the standardization layer 126. The standardization layer 126 may then make the request or standardized requests 202 available to the user 112a for selection through the user interface module 103.

Figure 4:
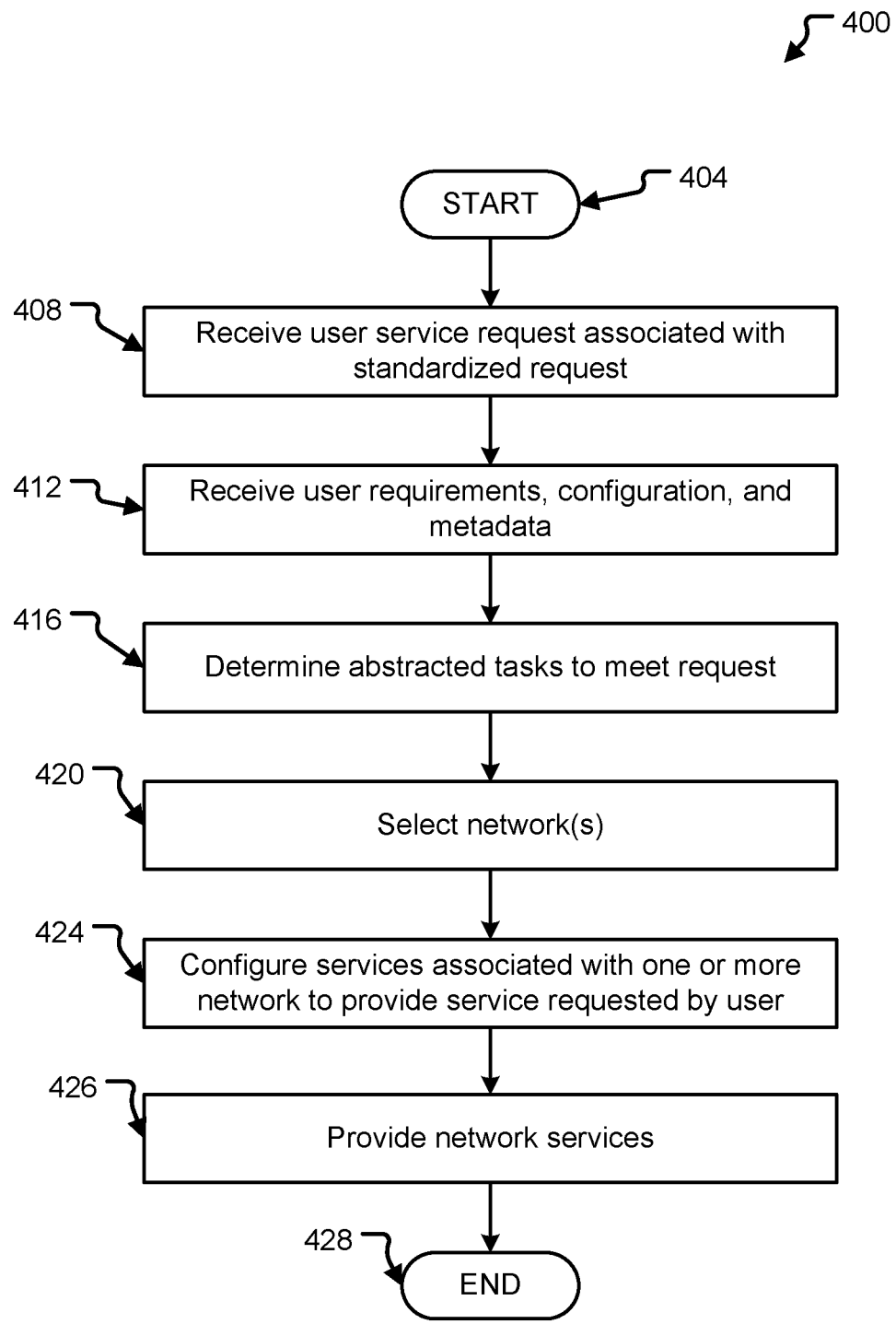
FIG. 4 depicts a method diagram for providing standardized network services in accordance with one implementation.

An example of a method 400 for providing network services may be as shown in FIG. 4. A general order for the operations of the method 400 is shown in FIG. 4. Generally, the method 400 starts with a start operation 404 and ends with an end operation 428. The method 400 can include more or fewer operations or can arrange the order of the operations differently than those shown in FIG. 4. The method 400 can be executed as a set of computer-executable instructions executed by a processor, such as processor of a component, and encoded or stored on a computer readable medium. Further, the method 400 can be performed by gates or circuits associated with a processor, an ASIC, a FPGA, a SOC, or other hardware device. Hereinafter, the method 400 shall be explained with reference to the systems, components, devices, modules, software, signals, data structures, interfaces, methods, etc. described herein; however, it will be understood by those of skill in the art that some or all of the operations of method 400 can be performed by or using different elements from those described below.

Method 400 may start and proceed to step 408 when a user request for service is received that is associated with a standardized request. For example, the computing services marketplace server 102 may receive a request from a user (e.g., through user interface module 103) inquiring about a new computing/network services-based service. For example, the request may involve the user entering into a marketplace application. The marketplace application may be a web application accessible using a web browser. The marketplace application may have a functionality that allows a user to select what networking-based services the user wants (either alone or in combination with a request for compute services). When the user enters the marketplace and requests a networking-based service, the user searches for standardized network services that may be provided by a number of providers using different technologies, implemented in hardware and/or software.

For example, a user may request a connection to a private or public networking gateway, may request a firewall be placed in front of the user's systems and/or data, may request a connection to a cloud-based service, etc. These requests may be presented as standardized and generic services for selection by the user, though the implementation/configuration of those services may be dependent on the particular network or network elements selected to provide such network service(s).

At operation 412, user requirements, configuration information, and metadata may be received. For example, a user may also indicate other preferences, such as preferred suppliers, preferred pricing models, etc. through a user interface, such as provided by user interface module 103. Further, the user's inputs and collected metadata may be evaluated, such as the user's geographical location, current networking capability, current configurations, etc. These user requirements, preferences, etc. are sent in a standardized request 218 to the network API server 111.

Flow proceeds to operation 416, where it is determined what abstracted tasks are needed to meet the user's request. For example, the network API server 111 can receive the user's request and requirements and determine the abstracted tasks 212 that have been mapped to the standardized request selected by the user and are needed to provide the requested service to the user. These determinations may include the functions and considerations of configuring the connections to provide access to the services and providing, provisioning, and/or configuring the network services-based service element(s). The request 210 may trigger several tasks, at different networks having different providers. For example, accessing an Amazon Web Services application may involve all the networking connections from a customer network element, through various networks, to an application within a cloud-hosted application endpoint environment. All the tasks to configure these different network elements, even those elements of different, competing network providers may be included in the tasks 212.

At operation 420, one or more network(s) is/are selected. For example, as discussed, the computing services marketplace server 102 can receive user the user selection of available network(s) through a user interface, such as provided by user interface module 103. In examples, the network(s) 106 can be identified by network operator(s)/provider(s). In other examples, the network(s) may be automatically selected, transparent to the user, by the network API server 111 (or computing services marketplace server 102) based on user preferences, a best-match algorithm, a least-cost algorithm, or otherwise. In examples, the selection of network(s) may include or be triggered by the computing services marketplace server receiving an order for the requested service(s).

At operation 424, the services associated with the selected network provider(s) may be configured to provide the requested service(s). For example, the computing services marketplace server 102 may send a request to the network API server 111 to configure network resources to provide the service requested by the user. This may include configuring switching devices or other network elements in the network(s) to provide a dedicated connection to the user.

As part of operation 424, the abstraction layer 128 of the network API server 111 may determine which network(s) 106 to complete the network-specific tasks 214, 216. The abstraction layer 128 can determine from information in the data structure 200 or otherwise to which network APIs 115 to call. The network APIs 115 may then interface with the network(s) 106 to reserve physical network elements (e.g., switchers, routers, etc.) of the selected network(s) and logically configure those elements by sending network-specific commands to the selected network(s) and network element(s).

Finally, at operation 426, the network service(s) may be provided. For example, the network API server 111 may enable the network services to be provided to the user as requested, including the network connections or the computing services service elements. The user may also be billed for the services.

In examples, the configurations of network elements can change dynamically. If the environment of the user changes, e.g., outages occur, changes in pricing occur, changes in network availability occur, etc., the network API service 111 can adjust the network-element configurations dynamically and automatically by translating the abstracted task(s) to network-specific task(s) for new/different network(s) and issuing network-specific commands to adjust the network-element configurations on the fly. Thus, the system 100 can continue to fulfill the user's request even in a changing environment. Further, as the changes can occur automatically, the network API server 111 can function as a hot standby to change configurations when needed to maintain service.

Further, the system 100 can also provide insight into price and value for the user 112a. The user 112a may provide some input as to desired prices or pricing structures. In other implementations, the user 112a may request the best value in the network providers chosen based on one or more metrics, for example, the amount of bandwidth provided per dollar. These inputs may allow the network API server 111 to select (or present to the user) a best match for network services providers during configuration.

Still further, the network API server 111 can also determine configurations based on conditions in the networks 106. For example, particular network(s) 106 chosen may be based on load balancing, usage agreements, etc. Thus, further metadata, associated with the network considerations, may be stored with the network-specific tasks 214, 216 to best configure the network elements for the user' request. This metadata may be retrieved or requested to better inform the decision as to which network 106 elements to configure.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more implementations, configurations, or aspects for the purpose of streamlining the disclosure. The features of the implementations, configurations, or aspects of the disclosure may be combined in alternate implementations, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed implementation, configuration, or aspect. Thus, the following claims are hereby incorporated into this Detailed Description, with each claim standing on its own as a separate preferred implementation of the disclosure.

Moreover, though the description of the disclosure has included description of one or more implementations, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative implementations, configurations, or aspects to the extent permitted, including alternate, interchangeable and/or equivalent structures, functions, ranges, or operations to those claimed, whether or not such alternate, interchangeable and/or equivalent structures, functions, ranges, or operations are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an implementation that is entirely hardware, an implementation that is entirely software (including firmware, resident software, micro-code, etc.) or an implementation combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium storing instructions that, when executed by one or more processors, causes the one or more processors to implement a particular method, algorithm, or function as described in this application.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device. Computer-readable storage media does not include computer-readable signal media.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

I claim:

1. A method for provisioning a network service, the method comprising:
    receiving a user request to provision a network service;
    determining an abstracted task to provision a network element associated with the network service based on the user request;
    determining a network-specific task associated with a first network and the abstracted task;
    configuring the network element to provide the network service to an endpoint by sending one or more network-specific commands associated with the network-specific task to the network element; and
    presenting a plurality of requests for standardized network services to a user, wherein the network element is configured in response to receiving a selection of one of the requests for standardized network services, wherein the one of the requests for standardized network services specifies the network service.

2. The method of claim 1, further comprising, in response to receiving the user request to provision the network service, configuring a second network element to provide the network service, the second network element being configured by sending one or more second network-specific commands to the second network element.

3. The method of claim 2, wherein the network element is associated with the first network, wherein the second network element is associated with a second network, wherein the one or more network-specific tasks are different from the one or more second network-specific tasks, and wherein the one or more network-specific commands are different from the one or more second network-specific commands.

4. The method of claim 1, wherein the network is selected from a plurality of networks based on an endpoint location of the endpoint.

5. The method of claim 4, wherein the network is selected based on a proximity of the endpoint location to a computing resource.

6. The method of claim 1, wherein the user request includes a required bandwidth.

7. The method of claim 6, wherein the network element is further configured based on the required bandwidth.

8. The method of claim 1, further comprising detecting changes in the first network; and, based on the changes in the first network, causing a second network element to be configured to connect to the endpoint.

9. One or more tangible non-transitory computer-readable storage media storing computer-executable instructions for performing a network service, the computer process comprising:
- receiving a user request to provision a network service;
- determining an abstracted task to provision a network element associated with the network service based on the user request;
- determining a network-specific task associated with a first network and the abstracted task;
- configuring the network element to provide the network service to an endpoint by sending one or more network-specific commands associated with the network-specific task to the network element; and
- presenting a plurality of requests for standardized network services to a user, wherein the network element is configured in response to receiving a selection of one of the requests for standardized network services, wherein the one of the requests for standardized network services specifies the network service.

10. The one or more tangible non-transitory computer-readable storage media of claim 9, the computer process further comprising: in response to receiving the user request to provision the network service, configuring a second network element to provide the network service, the second network element being configured by sending one or more second network-specific commands associated with second network-specific tasks to the second network element.

11. The one or more tangible non-transitory computer-readable storage media of claim 10, wherein the network element is associated with the first network, wherein the second network element is associated with a second network, wherein the one or more network-specific tasks are different from the one or more second network-specific tasks, and wherein the one or more network-specific commands are different from the one or more second network-specific commands.

12. The one or more tangible non-transitory computer-readable storage media of claim 10, wherein the second one or more network-specific commands is associated with a second network-specific task, and the first network-specific task and the second network-specific task are associated with the abstracted task.

* * * * *